United States Patent

Weilant

Patent Number: 5,832,777
Date of Patent: Nov. 10, 1998

[54] ELECTROMECHANICAL TRANSMISSION CONTROL APPARATUS

[75] Inventor: David R. Weilant, Muncie, Ind.

[73] Assignee: Borg-Warner Automotive, Inc., Sterling Heights, Mich.

[21] Appl. No.: 752,205

[22] Filed: Nov. 19, 1996

[51] Int. Cl.$^6$ .................................................. F16H 59/00
[52] U.S. Cl. ........................................... 74/335; 74/336 R
[58] Field of Search ..................... 74/335, 336 R, 74/477; 477/16

[56] References Cited

U.S. PATENT DOCUMENTS

| | | |
|---|---|---|
| D. 263,308 | 3/1982 | Miller . |
| 4,603,596 | 8/1986 | Akashi et al. . |
| 4,766,774 | 8/1988 | Tamai . |
| 4,817,468 | 4/1989 | Leigh-Monstevens et al. . |
| 4,821,590 | 4/1989 | Tury et al. . |
| 4,847,767 | 7/1989 | Carton et al. . |
| 4,911,031 | 3/1990 | Yoshimura et al. . |
| 4,912,997 | 4/1990 | Malcolm et al. . |
| 5,100,368 | 3/1992 | Chien . |
| 5,105,922 | 4/1992 | Yant . |
| 5,106,102 | 4/1992 | Mitsumoto . |
| 5,116,293 | 5/1992 | Reuter . |
| 5,130,941 | 7/1992 | Kudou . |
| 5,133,230 | 7/1992 | Ito et al. . |
| 5,154,100 | 10/1992 | Yamada et al. . |
| 5,154,479 | 10/1992 | Sautter . |
| 5,199,325 | 4/1993 | Reuter et al. . |
| 5,212,463 | 5/1993 | Babbitt et al. . |
| 5,230,256 | 7/1993 | Oizumi et al. . |
| 5,233,878 | 8/1993 | Klemen et al. . |
| 5,286,232 | 2/1994 | Engle . |
| 5,287,772 | 2/1994 | Aoki et al. . |
| 5,294,934 | 3/1994 | Matsumoto . |
| 5,305,665 | 4/1994 | Sano et al. . |
| 5,309,785 | 5/1994 | Knape . |
| 5,341,698 | 8/1994 | Tseng . |

Primary Examiner—Charles A. Marmor
Assistant Examiner—Marcus Charles
Attorney, Agent, or Firm—John A. Artz, Esq.; Greg Dziegielewski, Esq.

[57] ABSTRACT

An apparatus for controlling a transmission includes a shifting actuator with an plurality of electric motors for shifting gears of the transmission. A load on the synchronizer is measured when shifting the gears of the transmission. The load is measured by sensors on the load fork. Compensating springs can alternatively be included. The position of the fork relative to the synchronizer mechanism is determined by a position sensor in communication with the rod or in communication with the load fork itself.

18 Claims, 2 Drawing Sheets

ELECTROMECHANICAL TRANSMISSION CONTROL APPARATUS

TECHNICAL FIELD

The present invention relates to an apparatus for controlling a vehicular transmission, and more particularly to an apparatus for measuring the load imparted to synchronizers within a vehicular transmission.

BACKGROUND OF THE PRESENT INVENTION

In recent years electronically controlled vehicular transmissions employing computers have been developed. The transmission actuators for actuating such transmissions are generally hydraulically operated. These transmission actuator systems were typically too large in size and too heavy in weight and thus to costly to be production feasible.

In an attempt to solve these problems, many different transmission configurations have been developed to effectuate smooth efficient gear shifting. For example, U.S. Pat. No. 4,856,360 discloses a transmission control apparatus that measures the load on the synchromesh by a stroke sensor that measures how far the stroke lever has moved based on the electric current measured from the motor and a known range of prior values. The transmission then shifts the gears based on that measured value.

However, this configuration still has numerous drawbacks, including cost and the accuracy of measuring the load during motor operation as the load measurement is based partly on theoretical calculations and not actual load readings in the synchronizer shift mechanism itself.

SUMMARY OF THE INVENTION

The present invention provides for a transmission control apparatus for more accurately detecting the load during motor operation by measuring the load directly at the synchronizers.

Another object of the present invention is to provide a transmission control apparatus which efficiently communicates the measured load to the controller for shifting of the gears when necessary.

According to the present invention, there is provided an apparatus for controlling a transmission, having a plurality of synchronizers, comprising a shifting actuator having a plurality of electric motors for shifting appropriate gears of the transmission. Each motor has a rod that extends therefrom for controlling the movement of a rail. Each rail has a shift fork in communication therewith for shifting gears as required. Each shift fork has at least one load measurement sensor thereon for measuring the load on the fork when the actuator shifts the gears. A transmitter is associated with each of said forks for communicating the measured load to a controller to control the electric motor of the shifting actuator when shifting the gears.

Additional features and advantages of the present invention will become apparent to one of skill in the art upon consideration of the following detailed description of the present invention.

DESCRIPTION OF THE PREFERRED EMBODIMENTS

Figure 1:
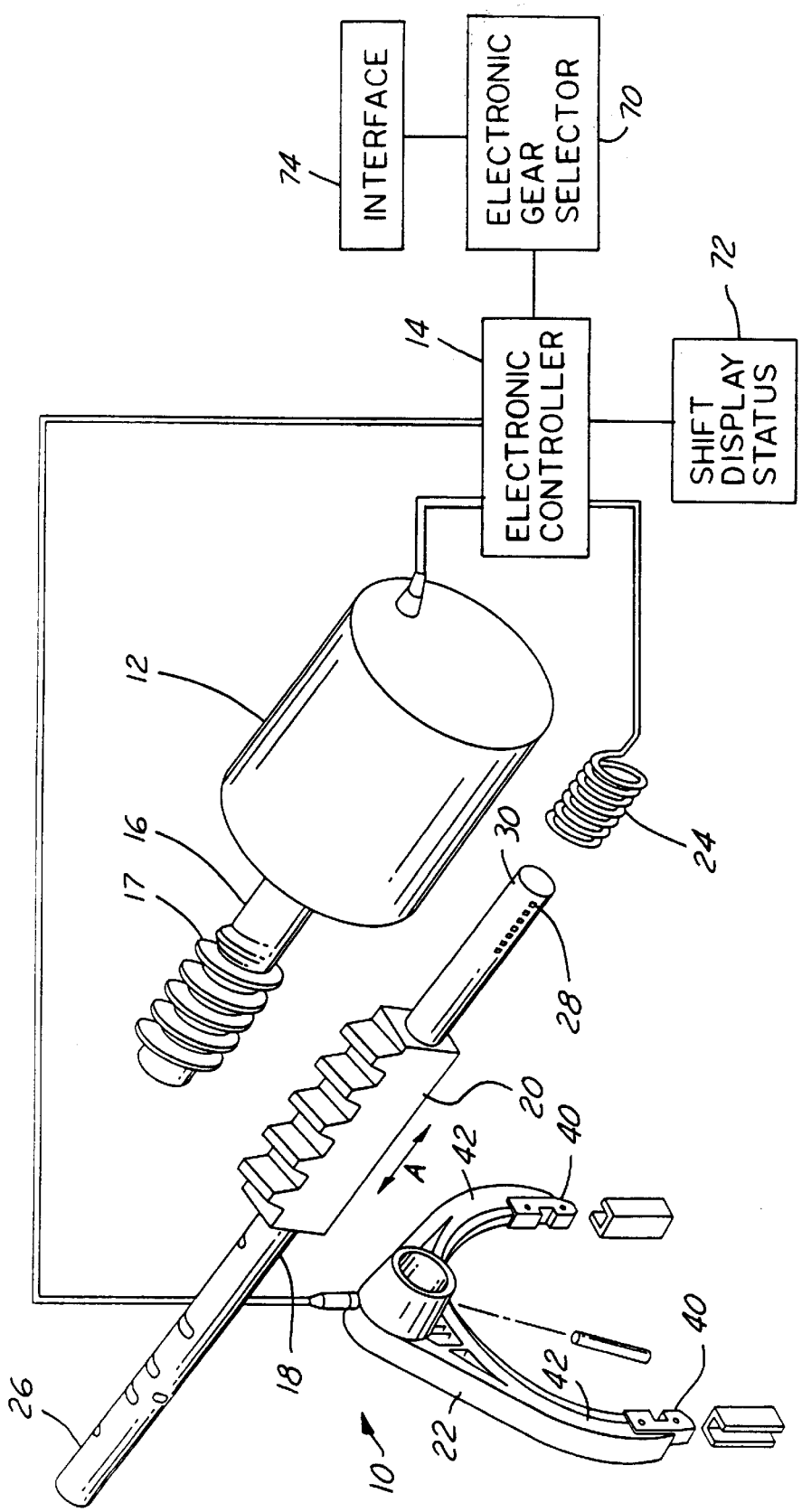
FIG. 1 schematically illustrates the load sensing apparatus in accordance with the preferred embodiment of the present invention.

Turning to FIG. 1, a shifting actuator 10 is disclosed. The shifting actuator 10 includes an electric motor 12, an electronic controller 14, a shifting rod 16 extending from the electric motor 12, a worm gear 17 formed on the shifting rod 16, a rail 18 having a gear rack 20 thereon, a shift fork 22, and a rail position sensor 24.

The controller 14 preferably includes a central processing unit for carrying out various calculations. The controller 14 receives a signal from the position sensor 24 via the communication means discussed below and then processes it as required.

The shifting rod 16 extends from the electric motor 12 and communicates with the gear rack 20 to position the fork 22. The shifting rod 16 preferably includes a worm gear 17 thereon for communication with the gear rack 20. The gear rack 20 is preferably mounted on the rail 18 and the shift fork 22 is attached to a first end 26 thereof. Alternatively, the gear rack 20 can be attached to a sliding fork on a fixed rail (not shown) or the rail 18 need only be in communication with the shift fork 22 and not attached thereto. The shifting rod can include any other means for transmitting movement to the rail, including any commercially available gear, such as a pinion for communicating with the rack. Alternatively, the rack and gear may be eliminated altogether and a clutch mechnaism may be used to transmit the torque from the motor to move the fork.

The rail 18 preferably has a plurality of position markers 28 included thereon. The position markers 28 are preferably located near a second end 30 of the rail 18. The use and attachment of position markers is well known to those of skill in the art and can be accomplished in a variety of different ways. The second end 30 of the rail 18 is configured such that it telescopes within the position sensor 24 such that the position of the rail 18 can be sensed thereby. The position sensor 24 communicates with the electronic controller 14 such that the sensed position of the rail 18 can be conveyed thereto. The communication between the position sensor 24 and the electronic controller 14 may be accomplished by any of a variety of well known ways, including wire, fiber optics or radio waves.

The shifting fork 22 is in communication with the shifting rod 16 for shifting gears between one position and another, for example, from between first and second gear positions. Likewise, shifting forks for shifting the gears from between third and fourth and between fifth and reverse are also included and are similarly in communication with a respective shifting rod. The structure of only one fork has been described, but that description applies to each of the shift forks illustrated in the drawings for shifting the respective gears.

Each shifting fork 22 includes at least one load sensor 40 positioned on one of its prongs 42 to monitor the synchronizer loading. If the sensors 40 indicate that the load is within acceptable limits, the gear shift will be completed. However, if the load is high, the gear shift will be adjusted and/or reattempted. The fork 22 is also in communication with the electronic controller 14 to transmit the synchronizer load information thereto. The communication between the shift fork 22 and the electronic controller 14 may be accomplished by any of a variety of well known ways, including wire, fiber optics, or radio waves. It should also be understood that the sensors need not be positioned only on the prongs of the fork, they can also be positioned on other parts of the fork, including the body.

When the electric motor 12 of the shifting actuator 10 is energized, the shifting rod 16 rotates, thus turning the worm gear 17. The rotation of the rod 16 and the worm gear 17 causes the gear rack 20 to move in the direction indicated by the arrow A. The gear rack 20 is preferably mounted to the rail 18 and thus it also moves in the direction indicated by the arrow A. By thus operating the shifting actuator 10, the transmission can select a desired gear position.

Figure 2:
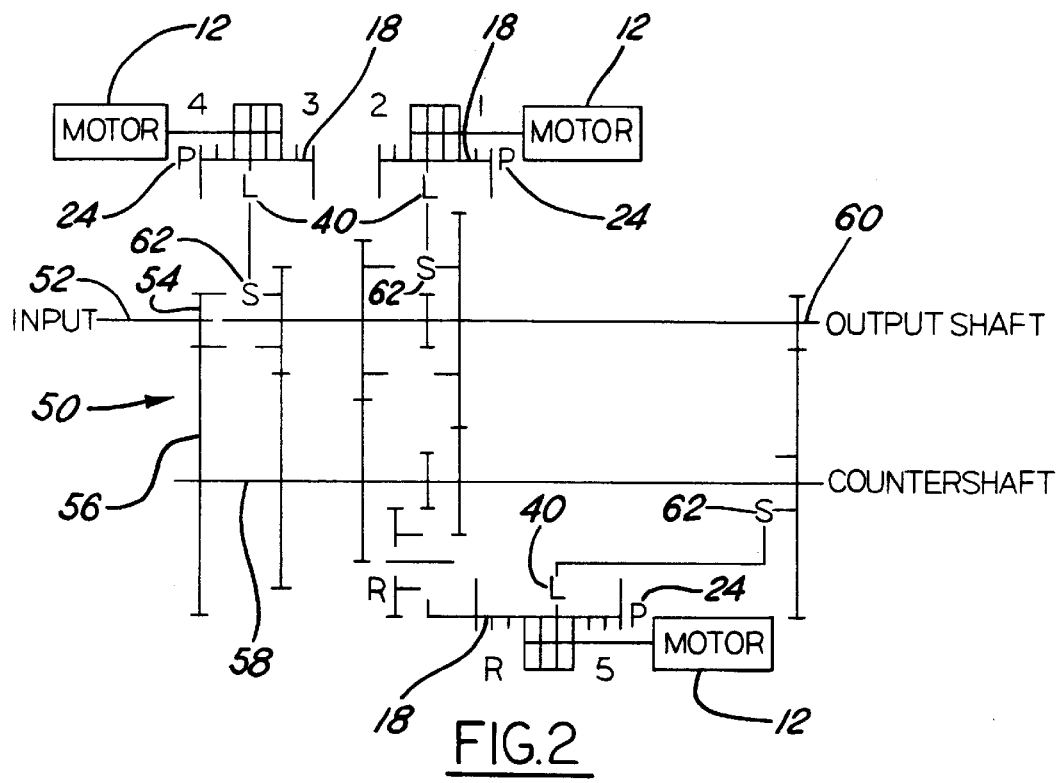
FIG. 2 is diagram illustrating the operation of the present invention with shift fork load sensors in accordance with a preferred embodiment of the present invention.

As shown in FIG. 2, an electric shift transmission 50, in accordance with a preferred embodiment of the present invention is disclosed. This is only one example of a transmission configuration that can be utilized with the present invention. Any known configuration can be used therewith. The transmission 50 is connected to an engine (not shown) and a clutch (not shown) by an input shaft 52. The clutch can be either actuated by a driver, such as a typical foot pedal, or by an electronic controller, to allow for interruption of torque transmittal during shifting. It should also be understood that the clutch can be electronically controlled. In this case, a servomechanism such as used in as a semi-automatic transmission or a non-hydraulic automatic transmission.

Based on FIG. 2, the operation of the transmission would be well known to those of skill in the art. Briefly, however, the input shaft 52 is rotating at a given speed and is connected to a first gear 54 which in turn is connected to a second gear 56. The second gear is connected to a countershaft 58 which rotates in response to the rotation of the second gear 56. Depending upon which gears are selected, whether they are selected automatically or by a gear selector, a certain gear ratio will be achieved, and the output shaft 60 will be driven at a certain speed. The output shaft 60 is in turn connected to the axle to drive the wheels.

Positions 1, 2, 3, 4, 5, and R indicate rail and fork position and each have a respective gear ratio to drive the output shaft. In operation, The controller 14 operates based on the receipt of certain signals. The signals that the controller 14 typically receives include (1) shift the motor 12 between positions 1 and 2, (2) shift the motor 12 between positions 3 and 4, or (3) shift the motor 12 between positions 5 and reverse. When the motor 12 receives a signal from the controller 14 to shift the transmission from first gear to second gear, the motor 12 causes the worm gear 17 to rotate, which in turn moves the rail 18 to the left in FIG. 2 such that second gear will be engaged. As shown better in FIG. 1, the rail 18 moves, the shift fork 22, positioned on its first end 26, moves the gears into intermeshing contact by use of the synchronizer 62. The position sensor 24 also monitors the position of the rail 18 and communicates the sensed position to the controller 14. Alternatively, a position sensor detector can also be used to detect the motion of the shift fork. Such a detector would also require the inclusion of position markings on the fork itself to be sensed by a separate detector.

As also shown in FIG. 2, a fork load sensor 40 is included on each fork to monitor the load on each of the synchronizers 62 and each fork load sensor is designated by the letter L. If the measured load is too large, (1) the motor will slow down, thus adjusting the synchronizer mechanisms such that proper engagement of the gears is achieved, or (2) the motor will reverse and re-engagement of the gears will be attempted.

Figure 3:
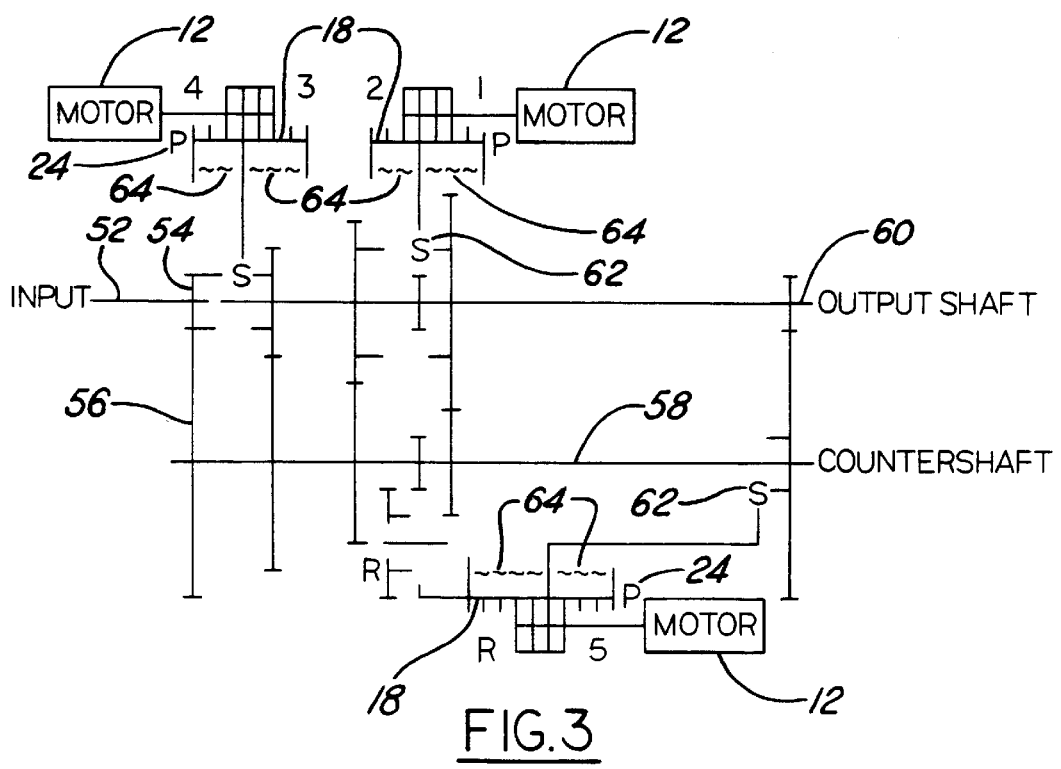
FIG. 3 is a diagram illustrating the operation of the present invention with rail position sensors in accordance with another preferred embodiment of the present invention.

Referring now to FIG. 3, which is an alternative embodiment of the present invention, a plurality of biasing springs 64 are included. The biasing springs 64 bias the shift fork 64 and allow it to move independently of the motor. The biasing springs 64 are advantageous in some respects because the fork apply load cannot always exactly match the synchronizer engagement load profile (for example, in a blockout condition). The biasing springs 64 are preferably positioned between the fork and the rail. The springs allow the gear to remain disengaged in a blockout condition, but when the blockout condition is alleviated, the springs 64 will bias the gears into full engagement. Alternatively, the springs 64 can be positioned between the rail and the rack. It should also be understood that the fork load sensors disclosed and described in connection with FIG. 2 can be used in combination with the compensating springs 64.

Regarding either the embodiment in FIG. 2 or 3, an electronic gear selector 70, allowing a user to select positions 1, 2, 3, 4, 5 and R (thus putting the vehicle in first gear, second gear, third gear, fourth gear, fifth gear, and reverse), a shift display status 72 indicating when a gear position has been selected and when the shift is complete, and a controller are all preferably included for efficient operation of the present invention. The electronic gear selector 70 has an interface 74 to allow a user to communicate with it.

While preferred embodiments of the invention have been described hereinabove, those skilled in the art will recognize that these embodiments may be modified and altered without departing from the central spirit and scope of the invention. Thus, these embodiments described hereinabove is to be considered in all respects as illustrative and not restrictive, the scope of the invention being indicated by the appended claims, rather than by the foregoing descriptions, and all changes which come within the meaning and range of equivalency of the claims are intended to be embraced herein.

I claim:

1. An apparatus for controlling a transmission, having a plurality of synchronizers, comprising:

a shifting actuator having a plurality of electric motors for shifting gears of the transmission;

a rod extending from each of said motors, and rotating in response thereto;

a rack in communication with said rod and moving in a linear direction in response to said rotation of said rod;

a shift fork in communication with each rod extending from each of said motors and moving in response to said movement of said rack, each shift fork helping to effect the engagement of a plurality of gears; and at least one load sensor positioned on each of said shift forks for determining the load on each synchronizer as a result of movement of said shift fork.

2. The apparatus of claim 1, further comprising a rail upon which said rack is mounted.

3. The apparatus of claim 2, further comprising a plurality of position markers formed on said rail.

4. The apparatus of claim 3, further comprising a position sensor that receives said rail telescoped therewithin such that said position markers are detectable by said position sensor.

5. The apparatus of claim 1, wherein each said shift forks is attached to one end of each of said rails.

6. The apparatus of claim 1, wherein each of said rods includes a gear for communicating with said rack.

7. The apparatus of claim 4, wherein said position sensor sends a signal to a controller regarding the position of said rail.

8. The apparatus of claim 4 wherein said position sensor sends a signal to a controller regarding the position of said shift fork.

9. The apparatus of claim 1, wherein a controller receives a signal from said load sensors on said fork regarding the load of said synchronizer.

10. An apparatus for controlling and monitoring the operation of a transmission, the transmission having at least one synchronizer, comprising:

an electronic gear selector having an interface to allow a user to communicate therewith;

a controller in communication with said gear selector to send signals to an electric motor to shift the transmission into a particular gear for activation thereof to shift the transmission into a particular gear;

a rod extending from said motor that rotates in response to activation of said motor;

a rack in communication with said rod that moves linearly in response to said rotation of said rod;

a shift fork in communication with said rack that moves in response to the movement of the rack to shift gears in accordance with said gear selector; and a load sensor on said fork for measuring the load on at least one synchronizer and sending a signal to said controller in response thereto.

11. The apparatus of claim 10, further comprising a shift display status for indicating when a gear is being shifted and when the shift is complete.

12. The apparatus of claim 10, wherein said rack is positioned on a rail that moves in response to the movement of said rack.

13. The apparatus of claim 12, wherein said rail includes a plurality of position markers thereon.

14. The apparatus of claim 13, further comprising a position sensor in telescoping arrangement with said rail such that said position markers are detectable by said position sensor to determine the position of said shift fork.

15. The apparatus of claim 10, wherein said controller is in communication with a plurality of motors and thus a plurality of shift forks to accomplish the shifting of various gears.

16. The apparatus of claim 10, wherein said electronic gear selector allows a user to select first gear, second gear, third gear, fourth gear, fifth gear, and reverse and said controller will automatically effectuate gear shifting in accordance therewith.

17. The apparatus of claim 10, wherein said rod includes a gear thereon from communicating with said rack.

18. The apparatus of claim 10, wherein said shift fork has a plurality of position markers that can be sensed by a position sensor to determine the position of said shift fork.

* * * * *